United States Patent [19]

Hsu

[11] Patent Number: 5,332,630
[45] Date of Patent: Jul. 26, 1994

[54] ON-BOARD RECHARGING SYSTEM FOR BATTERY POWERED ELECTRIC VEHICLES

[76] Inventor: Michael S. Hsu, Round Hill Rd., Lincoln, Mass. 01773

[21] Appl. No.: 787,218

[22] Filed: Nov. 4, 1991

[51] Int. Cl.⁵ .......................................... H01M 16/00
[52] U.S. Cl. ...................................... 429/20; 429/26
[58] Field of Search .................. 429/20, 26; 180/65.3

[56] References Cited

U.S. PATENT DOCUMENTS

| | | | |
|---|---|---|---|
| 3,321,334 | 5/1967 | Palmer | 429/26 |
| 3,441,444 | 4/1969 | Chesner et al. | 136/86 |
| 3,443,115 | 5/1969 | Timmerman, Jr. | 307/66 |
| 3,595,699 | 7/1971 | Baude | 136/86 B |
| 3,677,823 | 7/1972 | Trocciola | 429/20 |
| 3,843,410 | 10/1974 | Spahrbier | 136/86 R |
| 3,971,454 | 7/1976 | Waterbury | 180/65 |
| 4,081,693 | 3/1978 | Stone | 307/66 |
| 4,277,737 | 7/1981 | Muller-Werth | 320/2 |
| 4,614,628 | 9/1986 | Hsu et al. | 264/61 |
| 4,629,537 | 12/1986 | Hsu | 204/15 |
| 4,713,303 | 12/1987 | Farooque | 429/26 |
| 4,721,556 | 1/1988 | Hsu | 204/258 |
| 4,853,100 | 8/1989 | Hsu | 204/256 |
| 4,931,947 | 6/1990 | Werth et al. | 364/492 |
| 4,961,151 | 10/1990 | Early et al. | 364/492 |
| 4,962,462 | 10/1990 | Fekete | 364/492 |
| 4,988,283 | 1/1991 | Nagasawa et al. | 429/17 |

FOREIGN PATENT DOCUMENTS

| | | |
|---|---|---|
| 0334474 | 9/1989 | European Pat. Off. . |
| 4001684 | 7/1991 | Fed. Rep. of Germany . |
| 4116899 | 11/1991 | Fed. Rep. of Germany . |
| 59-136006 | 8/1984 | Japan . |
| 63-002263 | 1/1988 | Japan . |
| 63-143756 | 6/1988 | Japan . |
| 01-166470 | 6/1989 | Japan . |
| 01-320773 | 12/1989 | Japan . |
| 2132108 | 7/1984 | United Kingdom . |

OTHER PUBLICATIONS

"Fuel Cell Power Source System," Japanese Patent Abstracts, vol. 12, No. 261 (Feb. 1988).

Adcock et al., "Prospects for the Application of Fuel Cells-in Electric Vehicles," Journal of Power Sources, vol. 37, pp. 201–207 (Jan. 1992).

Chi et al., "Air-Cooled PAFC and Ni-Cd Batteries-A Marriage That Works?" Proceedings of the 23rd Intersociety Energy Conversion Engineering Conference, vol. 2, pp. 233-238 Jul. 31, 1988–Aug. 5, 1988.

"Fuel Cells for Transportation;" Advanced Energy Systems, Mechanical Engineering; Aug. 1989 pp. 74-77.

*Primary Examiner*—Stephen Kalafut
*Attorney, Agent, or Firm*—Thomas J. Engellenner

[57] ABSTRACT

A power supply system for powering an electric motor in an electric vehicle includes a rechargeable battery connected to the motor for driving the motor and a fuel cell assembly connected to the battery for recharging the battery. The system further includes structure for providing a supply of fuel to the fuel cell assembly which in turn converts the fuel to electricity.

17 Claims, 4 Drawing Sheets

ON-BOARD RECHARGING SYSTEM FOR BATTERY POWERED ELECTRIC VEHICLES

BACKGROUND OF THE INVENTION

The invention relates generally to the field of vehicle propulsion systems. In particular, the invention concerns an on board recharging system for a battery powered electric vehicle.

As concerns surrounding traditional energy sources persist, investigation into alternative forms of energy are becoming increasingly important. In particular, environmental and political concerns associated with combustion based energy systems can not be ignored. In an effort to reduce dependence on these types of energy supplies and methods, therefore, the focus is likely to be on devices capable of generating electricity by consuming plentiful or renewable supplies of fuels without requiring combustion.

In addition to being utilized for the generation of electricity, however, combustion based fuels are most commonly utilized for driving motor vehicles. Indeed, motor vehicles are among the chief consumers of combustion based fuels and, therefore, they are among the chief contributors to pollution problems associated with such fuels. So, while alternative energy sources such as nuclear and hydroelectric systems may be suitable for large scale electric utilities, for obvious reasons they do not present an ideal solution to the problems associated with motor vehicle power requirements.

Alternatives to internal combustion engine powered motor vehicles have included various types of battery powered electric vehicles. A problem associated with most known battery powered vehicles, however, is the constant need for recharging which requires taking the vehicle out of service.

Fuel cells, therefore, have been explored as a means for powering electric vehicles and reducing the constant need to recharge the vehicle from off-board sources. Fuel cells electrochemically convert hydrocarbons and hydrogen to electricity- No combustion reaction is needed. Because they are compact in structure, high in efficiency, and low in pollutants, fuel cells provide several advantages for use in vehicle transportation. Accordingly, they appear to be well suited for adaption for motor vehicle applications.

A drawback associated with known fuel cell systems, however, is that they are not economically viable for applications in which the power rating of the fuel cell must meet propulsion demands. In motor vehicle applications, for example, a fuel cell system designed to provide sufficient power required by the vehicle for cruising, let alone for peak surge, would be prohibitively expensive. While various known systems have attempted to exploit the advantages of designating a surge battery to meet peak demand in motor vehicle applications, none has satisfactorily overcome the economic problems.

It is an object of the invention, therefore, to provide a system for powering a motor vehicle which does not require a combustion reaction. It is another object of the invention to provide such a system which has a range comparable with that of traditional combustion engines without requiring interruptive recharging from off-board sources. It is still another object of the invention to provide an economically feasible system for powering a motor vehicle which can accommodate typical motor vehicle surge and range demands.

SUMMARY OF THE INVENTION

These and other objects are achieved by the present invention which in one aspect features a power supply system for powering an electric motor in an electric vehicle. The system includes a rechargeable battery for powering the motor. It is a significant feature of the invention that the system further includes a fuel cell assembly, connected to the rechargeable battery, for recharging the battery. Means are provided for delivering a supply of fuel to the fuel cell assembly wherein the fuel is electrochemically converted to electricity for recharging the battery. By integrating a continuous output, on-board power-supply with an electric vehicle, the invention significantly reduces or eliminates the dependence of such vehicles on off-board recharging.

Various types of fuel cells are suitable for use in conjunction with the invention. For example, in addition to solid oxide fuel cells, molten carbonate fuel cells, phosphoric acid fuel cells, alkaline fuel cells, and proton electrolyte membrane fuel cells are suitable as well. Other types of fuel cells will be apparent to those skilled in the art.

In another aspect, the invention features an assembly of fuel cells for converting fuel to electricity to recharge a battery. One embodiment of this aspect of the invention includes a cylinder head cooling jacket, which defines a fuel cell chamber, and a fuel cell stack arranged within the fuel cell chamber. A thermal control cylinder is movable within the fuel cell chamber between a deployed position wherein it is axially aligned with the fuel cell stack and a stowed position wherein it is axially offset from the fuel cell stack. Again, means are provided for delivering fuel and air to the fuel cell stack.

In a particularly advantageous embodiment of this aspect of the invention, the cylinder head cooling jacket defines a start-up preheating port for delivering hot gases to the fuel cell chamber. This enables heated gases to be provided to the fuel cell chamber during the initiation of the electrochemical conversion.

The thermal control cylinder of the invention regulates the temperature of the fuel cell stack at a constant value independent of power output. The stowed position presents low thermal resistance to allow maximum waste heat removal by the cooling jacket while the fuel cell stack operates at full load to recharge the battery. The deployed position presents a high thermal resistance to insulate the fuel cell stack to minimize heat loss while the fuel cell stack is in a low load condition, such as when the battery does not need recharging and the fuel cell is in a stand-by mode.

In another embodiment, this aspect of the invention features an interdigitated array of converter elements and cooling elements. A fuel cell stack is arranged within the converter elements. By selectively establishing a rate of flow of cooling fluid through the heat transfer elements, the rate of heat transfer from the converter elements to the cooling elements can be controlled. Accordingly, as with the above discussed embodiment of the invention, the temperature of the fuel cell assembly can be regulated independently of power output.

These and other features of the invention will be more full appreciated by reference to the following

DETAILED DESCRIPTION OF ILLUSTRATED EMBODIMENTS

In its broadest aspect, the invention features a fuel cell power supply system allowing load variability. This system is suitable for powering an electric motor in an electric vehicle. In accordance with the invention, a fuel cell assembly is utilized to continuously provide power for recharging a battery which powers the motor. In this regard, the fuel cell assembly acts as a trickle charger for the battery. The system has the advantage that because the fuel cell assembly does not directly power the drive train of the vehicle, the power rating required of the fuel cell assembly is reduced. The steady power output of the fuel cell assembly is determined by the energy drain on the battery. In some applications, the fuel cell assembly can be operated to produce more electricity than that required for operation of the vehicle. This excess electricity can be delivered off-board for various uses such as, for example, household and/or commercial uses.

Electric vehicles themselves are well known in the art. For example, typical electric vehicles can be powered by nickel-cadmium batteries which drive electric motors of anywhere from twenty to one-hundred horsepower. The batteries are generally rechargeable by DC power supplies. A problem with known systems, however, is that they offer limited range between required recharging stops. While solar rechargeable systems, such as are available with the electric vehicle offered by Solectria of Arlington, Mass., have been proposed to reduce the need for frequent off-board recharging. Drawbacks associated with the solar generation of electricity, however, include its usefulness being limited to clear weather and daylight hours.

Figure 1:
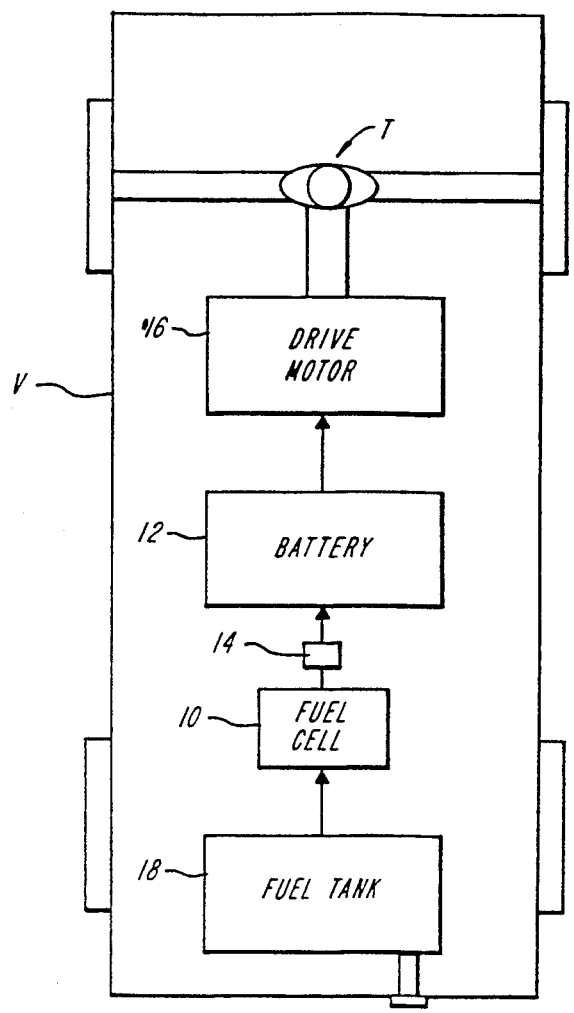
FIG. 1 is schematic diagram depicting a power supply system for an electric vehicle constructed in accordance with the teachings of the present invention.

Accordingly, FIG. 1 is a block diagram of an electrically powered vehicle V including the improved power supply system of the invention. The system includes a fuel cell assembly 10 which is electrically connected to a rechargeable battery 12. The battery 12 is connected to an electric motor 16 which drives a motor vehicle drive train T. The fuel cell assembly 10 receives fuel such as, for example, methane, from a fuel supply tank 18 and electrochemically converts it, in a manner described in greater detail herein below, to recharge the battery 12. Arranged between the fuel cell assembly 10 and the battery 12 is a voltage regulator 14. This circuitry will be well known to those skilled in the art of motor vehicles in general and electrically powered motor vehicles in particular.

It is a significant feature of the invention that the fuel cell assembly 10 does not directly provide power to the electric motor 16. Rather, fuel cell assembly 10, battery 12, and electric motor 16 act in series. The fuel cell assembly 10, under steady operation, is primarily utilized for on-board recharging. Positive and negative electrical leads of the fuel cell assembly 10 stack are connected to corresponding leads on the battery 12 to transfer recharging energy, as required, from the fuel cell assembly 10 to battery 12.

In one embodiment of the invention, the fuel cell assembly 10 comprises a solid oxide fuel cell. A solid oxide fuel cell is an electrochemical converter which employs solid oxide electrolytes. Such converters are capable of high efficiencies, depending only the relation between the free energy and enthalpy of the electrochemical reaction. Solid oxide fuel cells can be operated within a temperature range of between room temperature to 2000° C. An example of a solid oxide fuel cell is described in U.S. Pat. No. 4,614,628 (Sep. 30, 1986 to Hsu et al.), the teachings of which are hereby incorporated herein by reference.

Figure 2A:
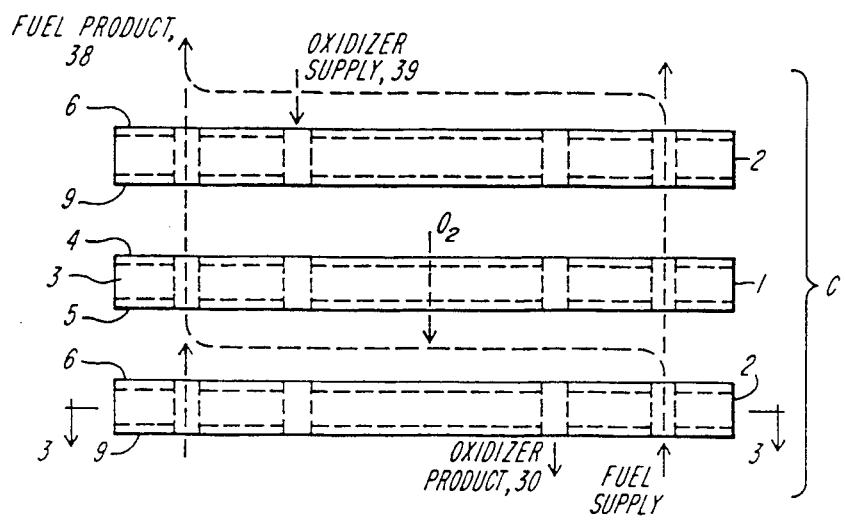
FIGS. 2A, 2B, and 2C are various views of a high efficiency solid oxide fuel cell suitable for use in conjunction with the power supply system of the invention.
Figure 2B:
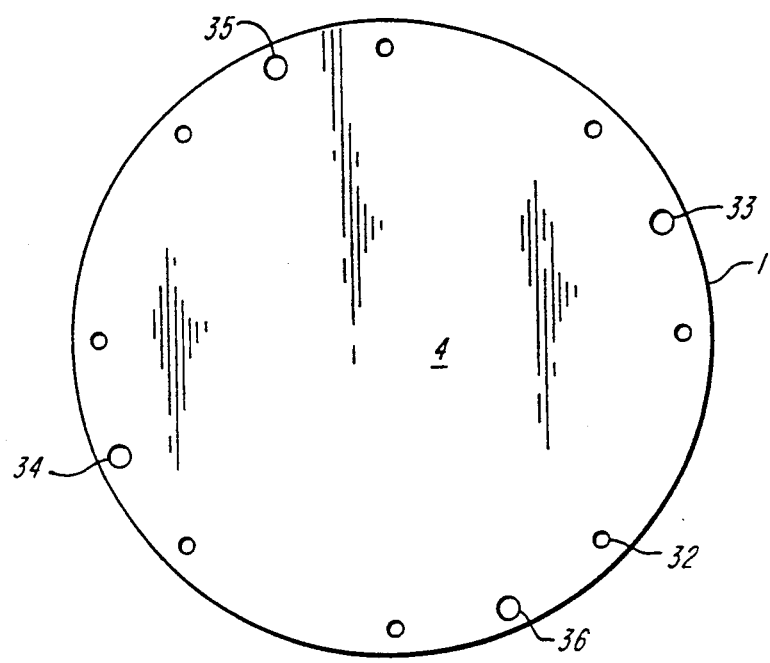
Figure 2C:
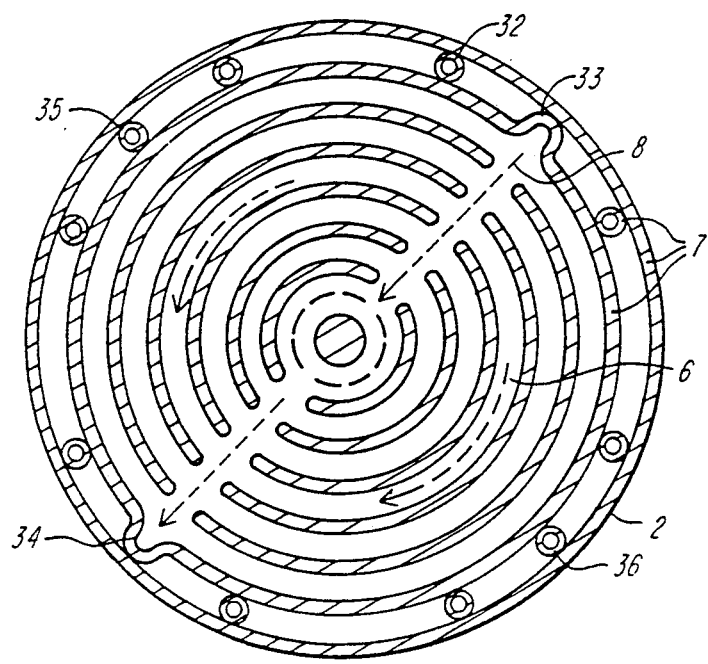

The basic fuel cell stack C is shown in FIGS. 2A, 2B, and 2C and comprises a single electrolyte plate 1 and a single conductor plate 2. The electrolyte plate 1 is made of stabilized zirconia $ZrO_2.(Y_2O_3)$, component 3, on which porous oxidizer electrode 4 and porous fuel electrode 5 are coated. Preferred materials for oxidizer electrodes are perovskites such as $LaMnO_2(Sr)$. Preferred material for fuel electrodes are cermets such as $ZrO_2/Ni$. The conductor plates serve as: electric connections between adjacent electrolyte plates 1; gas partitions; and heat conduction paths between electrode surfaces 4, 5 and the edges of plates 1, 2.

Fuel such as methane, can be fed to the stacked cell unit through axial (with respect to the stack) manifold 37 provided by holes 33, and the reaction products (primarily water and $CO_2$) exhausted through manifold 38 provided by holes 34. The fuel is distributed over the fuel electrode surface 5 through an in-plane groove network 6 formed in the upper surface of the conductor plate 2. Notches 8 made in the ridges 7 provide openings connecting manifolds 37, 38 through holes 33, 34 to fuel the electrode 5. Oxidizer is fed to the stacked cell unit through manifold 39 provided by holes 35 and its product is exhausted through manifold 30 provided by holes 36. Oxidizer is distributed over the oxidizer electrode surface 4 through an in-plane groove network 9 formed in the lower surface of the conductor plate 2 of the adjacent cell unit. Notches similar to notches 8 and ridges similar to ridge 7 provide openings connecting manifolds 37, 38 through holes 33, 34 to oxidizer electrode 4.

The ridges 7 forming side walls of the groove network 6 and 9 on the conductor plates 2 are brought into contact with electrolyte plates 1 in the stack assembly. The ridges 7 are pressed against the porous electrode 5 and the electrode 4 of the adjacent cell unit, respectively, in assembly to achieve electrical contacts. The ridges at the outer edge of the conductor plates 2, the ridges along the edge of bolt holes 32, the ridges along the edge of the upper surface of the conductor plates 2 around the holes 35, 36 and the ridges of the lower surface of the conductor plates 2 around the holes 33, 34 are brought into contact with surface coating which has identical structure as the electrode coatings. These circumferential ridges which are not notched are pressed against the porous coating 4, 5 in assembly to achieve gas seals. Tension rods (not shown) which are concealed in bolt holes 32 are used to provide the assembly force. The term Converter Elements in Item 5 is equivalent tot he term Fuel Cell Stack in Item 4. The Fuel Cell Stack of 1 kW capacity may consist of approximately 50 to 100 pairs of conductor plates and the electrolyte plates.

Various other techniques can be employed to construct fuel cells useful in the present invention. Alternative designs for solid oxide electrochemical fuel cells are disclosed, for example, in U.S. Pat. No. 4,721,556 issued to Hsu on Jan. 26, 1988 and U.S. Pat. No. 4,853,100 issued to Hsu on Aug. 1, 1989, the teachings of both of which are hereby incorporated herein by reference. Additionally, other types of fuel cells such as molten carbonate fuel cells, phosphoric acid fuel cells, alkaline fuel cells, photon electrolyte membrane fuel cells and solid oxide fuel cells using electrolyte other than zirconia can be utilized as well.

Figure 3:
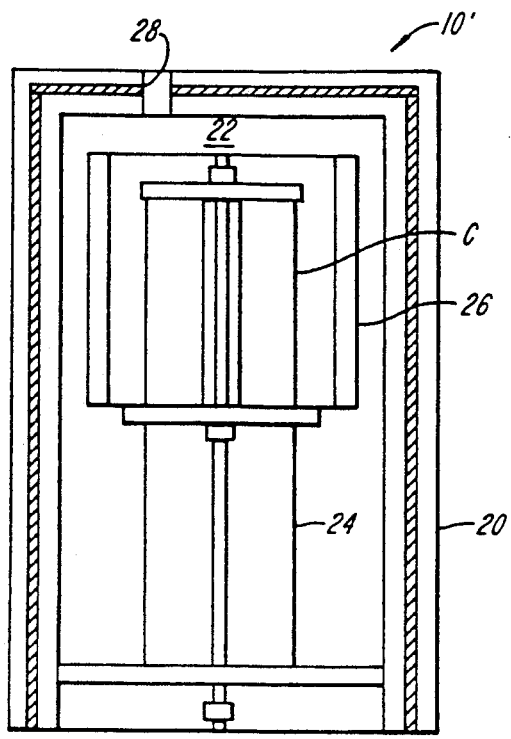
FIG. 3 is a schematic diagram depicting a fuel cell assembly suitable for use in conjunction with the power supply system of the invention, the assembly including a thermal control cylinder shown in its deployed position.
Figure 4:
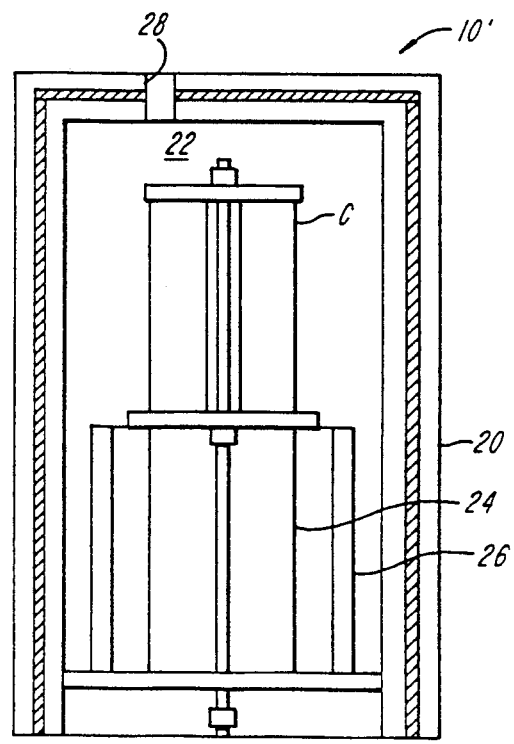
FIG. 4 is a schematic diagram of the assembly shown in FIG. 3, the thermal control cylinder being shown in its stowed position.

An illustrative fuel cell head 10', a group of which typically form the fuel cell power assembly, is shown in FIGS. 3 and 4 including a fuel cell stack C. The head 10' includes a cooling jacket 20 which defines a fuel cell chamber 22. The fuel cell stack C is arranged within the fuel cell chamber 22 wherein it is fed with fuel and air through manifolds 24. The assembly further includes a thermal control cylinder 26 movable between a deployed position, such as shown in FIG. 3, wherein it is axially aligned with the fuel cell stack C, and a stowed position, such as shown in FIG. 4, wherein it is axially offset from the fuel cell stack C. The thermal control cylinder 26 can also be arranged at various positions between the deployed and stowed positions.

A typical fuel cell stack operates at an energy efficiency between 40%–50% with the lost energy being dissipated in the form of heat. At full power operation, therefore, a large quantity of heat must be removed. Correspondingly, at the idle condition, waste heat is minimum.

Accordingly, in order to maintain the fuel cell assembly at a constant temperature during both full power operation and idling, variable thermal resistance must be established between the heat source, the fuel cell stack C, and the heat sink, the cooling jacket 20. The thermal control cylinder 26, which has a construction similar to that of a commercially available thermos, is capable of performing such a function.

For example, during idling of the motor 16, the thermal control cylinder 26 is moved into the deployed position as shown in FIG. 3 to present a high thermal resistance between the fuel cell stack C and the cooling jacket 20. Accordingly, there is relatively low waste heat removal from the fuel cell stack C and the temperature of the stack, as is desired, is maintained at an appropriate level. On the other hand, during full power operation of the motor 16 and, hence, full power operation of the fuel cell stack C, the thermal control cylinder 26 is moved into the stowed position to present a low thermal resistance between the fuel cell stack C and the cooling jacket 20. Accordingly, there is high waste heat removal from the fuel cell stack C to prevent the temperature of the fuel cell stack C from reaching a dangerously high level.

The positioning of the thermal cylinder may be achieved by a mechanical linkage (not shown) which will be readily known to those skilled in the art. The linkage can be controlled by a thermal sensor control such as various commercially available thermostats. Heat collected at the heat sink, the cooling jacket 20, is circulated through a radiator (not shown) for dissipation to the atmosphere.

In various embodiments of the invention, the cooling jacket 20 defines a start-up preheating port 28 for enabling the delivery of heated gases to the fuel cell chamber 22. This facilitates the preheating and the electrochemical conversion performed by the fuel cell stack C and hence, achieve the quick start after system shutdown.

Figure 5:
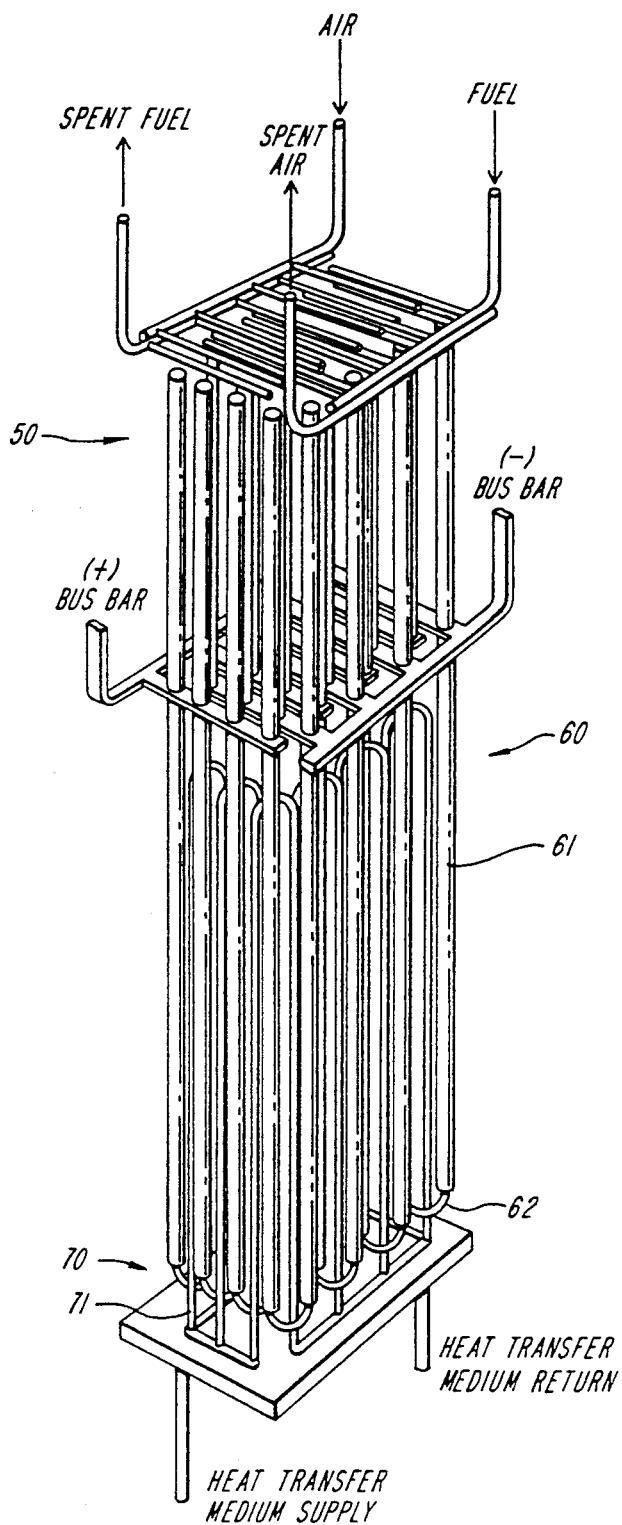
FIG. 5 is a perspective view of another embodiment of a fuel cell assembly suitable for use in conjunction with the power supply system of The invention.

In another embodiment, the invention features a fuel cell system 50 such as is shown in FIG. 5. The system 50 is typically enclosed within an outer fixed insulation jacket such as the thermal cylinder 26 or other thermal insulation containers. The system 50 includes a fuel cell assembly 60 and a cooling assembly 70. The fuel cell assembly 60 is formed by converter elements 61 joined by U-bend connectors 62. Alternating electrolyte plates 1 and conductor plates 2, such as are shown in FIGS. 2A, 2B, and 2C, are disposed within the converter elements 61. As discussed in greater detail above, holes through the plates 1 and 2 form the passages for fuel and oxidizer gases. Grooves in the conductor plates 2 facilitate the distribution and collection of the gases.

The cooling assembly 70 facilitates the removal of thermal energy, such as the waste heat discussed above, from the converter elements 61. The bulk integration of converter elements 61 and cooling elements 71 is achieved by alternating the elements 61 and 71 in an interdigitated array, as shown in the figure. The heat transfer from the converter elements 61 to the cooling elements 71 primarily relies upon thermal radiation. The radiative thermal coupling is capable of high heat flux. It offers mechanical decoupling, and thus relaxes constraints in design and material selections of the cooling elements 71. Additionally, the array pattern of a bulk integration provides better temperature uniformity among the converter elements 61 resulting in optimal system performance.

The coolant used in the cooling elements 71 can be maintained at liquid phase under pressure similar to the conventional automobile cooling circuit operation. Thermostats can be used to regulate the coolant flow rate to achieve the constant temperature control of the fuel cell elements 61 over the operation power range. Heat collected in the heat transfer array is circulated through a radiator for dissipation ti the atmosphere.

Accordingly, in this embodiment of the invention, the temperature of the fuel cell assembly 50 is maintained at a specific constant level independently of power output by controlling the flow of coolant through the cooling elements 71. When, for example, the recharge of battery is under full load, a high coolant flow rate is established to effect maximum heat removal from the converter elements 61. Alternatively, when the battery is fully charged and the motor is in an idle condition, thereby requiring little to no power output from the fuel cell assembly 50, a low coolant flow rate is established through the cooling elements 71 to effect minimum heat removal from the converter elements 61. This maintains the temperature of the converter elements 61 at a sufficiently high level to facilitate the initiation of the electrochemical conversion cycle when elevated power output is required.

Alternatively, in initial start up after system shutdown, the heating of the fuel cell system 50 can rely on the transfer heat from the cooling elements 71 to the fuel cell elements 61, heated fluid can be flowed through the cooling elements 71. Again, the heat transfer rate can be controlled by controlling the flow rate through the heat transfer elements 71.

Other alterations to the above described embodiments of the invention will be readily apparent to those ordinarily skilled in the art and are intended, therefore, to be embraced within the spirit and scope of the invention. The invention is to be defined, therefore, not by the preceeding description but by the claims that follow.

What is claimed is:

1. A system for recharging a battery, the system comprising
    a rechargeable battery,
    a fuel cell system connected to the battery and adapted for providing power to continuously recharge the battery corresponding to a varying load placed on said battery,
    means for controlling the temperature of said fuel cell system independently of the power output of said fuel cell system, and
    means for providing a supply of fuel and oxidizer to said fuel cell system, said fuel cell system being adapted for the conversion of said fuel to electricity.

2. A system as set forth in claim 1, further comprising a voltage regulator for regulating the power supply to said rechargeable battery.

3. A system as set forth in claim 1, wherein said battery further comprises electrical leads to power an electric motor in an electric vehicle.

4. A system as set forth in claim 3, wherein said fuel cell system is adapted for selectively providing power directly to said electric motor.

5. A system as set forth in claim 1, wherein said fuel cell system comprises a stack of solid oxide fuel cells of operating temperature ranging from room temperature to 2000° C.

6. A system as set forth in claim 1, wherein said fuel cell system comprises a stack of fuel cells selected from the group consisting of molten carbonate fuel cells, phosphoric acid fuel-cells, alkaline fuel cells, and proton electrolyte membrane fuel cells.

7. A system as set forth in claim 1, wherein the battery is a high temperature battery operating in the range between 50 and 500° C.

8. A fuel cell assembly for converting fuel to electricity in response to a varying load, the assembly comprising
    at least one fuel cell head comprising
        a cooling jacket defining a fuel cell chamber,
        a fuel cell stack arranged within said fuel cell chamber, and
        a thermal control cylinder movable within said fuel cell chamber between a deployed position wherein said cylinder presents a high thermal resistance to said fuel cell stack and a stowed position wherein
    said cylinder presents a low thermal resistance to said fuel cell stack, means for positioning said thermal control cylinder, and means for delivering a mixture of fuel and air to said fuel cell stack.

9. An assembly as set forth in claim 8, wherein said cooling jacket further defines a start-up preheating port for delivering heated gas to said fuel cell chamber.

10. An assembly as set forth in claim 8, further comprising a battery, wherein said at least one fuel cell head produces electricity for recharging the battery.

11. An assembly as set forth in claim 10, wherein said battery further comprises electrical leads for connection to an electric motor in an electric vehicle.

12. A system as set forth in claim 8, wherein said fuel cell assembly further comprises means for selectively providing power directly to an electric motor.

13. A power supply system for powering an electric motor in an electric vehicle, the system comprising
    a rechargeable battery having an electrical power storage capacity and electrical leads for connection to a motor to deliver electrical power to the motor,
    a fuel cell system connected to said battery for continuously supplying power to recharge said battery at a rate which is related to the energy drain of said battery, said fuel cell system adapted for selectively providing power off-board of the vehicle, and
    means for providing a supply of fuel and oxidizer to said fuel cell system, said fuel cell system being adapted for the conversion of said fuel to electricity.

14. A fuel cell assembly for converting fuel to electricity in response to a varying load, the assembly comprising
    at least one fuel cell assembly comprising
        an interdigitated array of columnar fuel cell elements and columnar cooling elements, and
        a fuel cell stack disposed within each of said fuel cell elements,
    means for variably establishing a flow of heat transfer fluid through said cooling elements for presenting a variable thermal resistance to said fuel cell elements, and
    means for delivering a supply of fuel and air to said fuel cell elements,
    wherein said cooling elements are adapted for accommodating flow of both cooling fluid and heating fluid so as to enable said cooling elements to selectively remove heat from said fuel cell elements depending upon the load or provide heat to said fuel cell elements depending upon the load.

15. A fuel cell assembly for converting fuel to electricity in response to a varying load, the assembly comprising
    at least one fuel cell assembly comprising
        an interdigitated array of columnar fuel cell elements and columnar cooling elements, and
        a fuel cell stack disposed within each of said fuel cell elements,
    means for variably establishing a flow of heat transfer fluid through said cooling elements for presenting a variable thermal resistance to said fuel cell elements,
    means for delivering a supply of fuel and air to said fuel cell elements, and
    a battery element, wherein said at least one fuel cell head produces electricity for recharging said battery.

16. An assembly as set forth in claim 15, wherein said battery is utilized for powering an electric motor in an electric vehicle.

17. A system as set forth in claim 16, wherein said fuel cell system is adapted for selectively providing power directly to said electric motor.

* * * * *